2,889,507

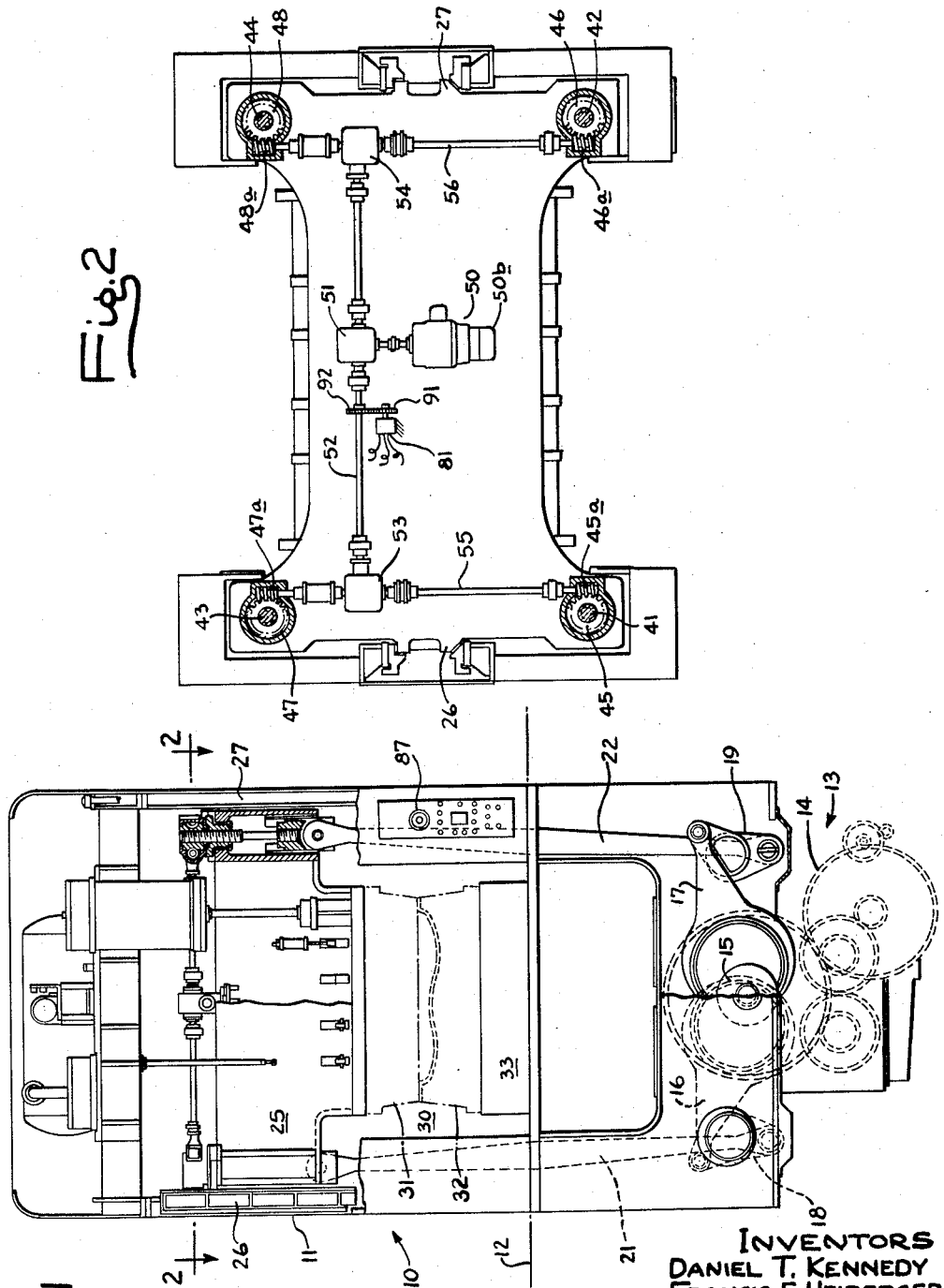

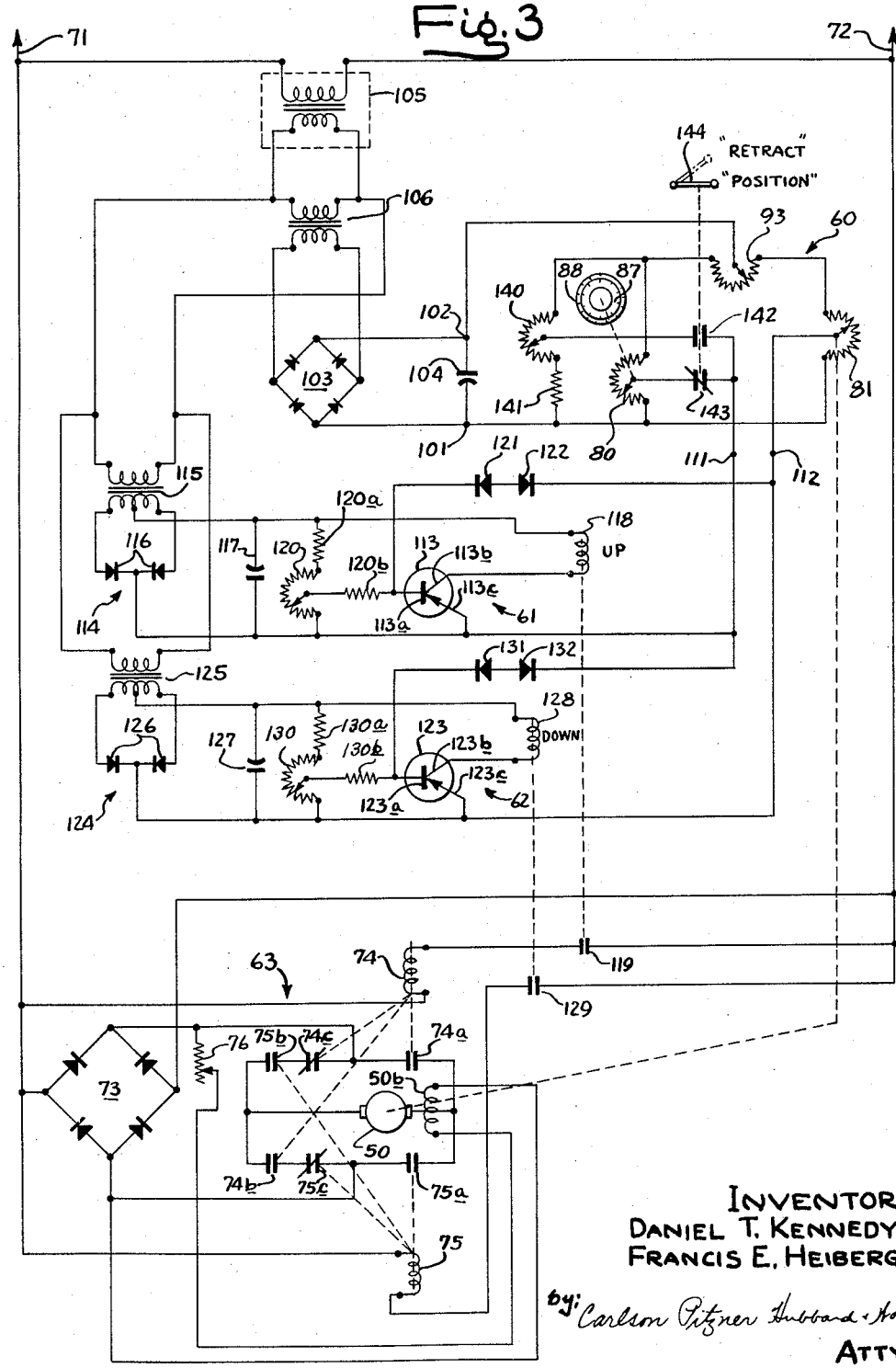

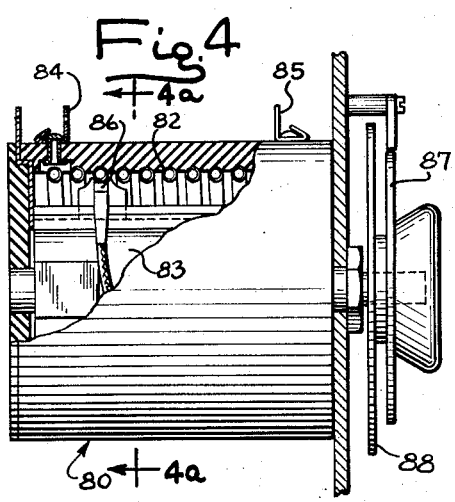
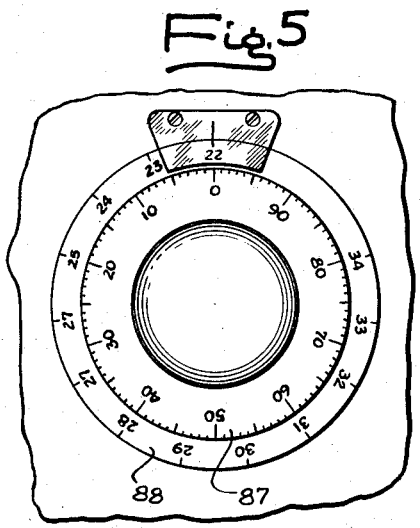
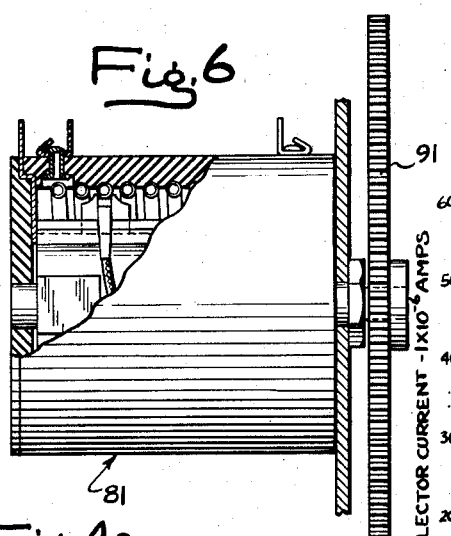
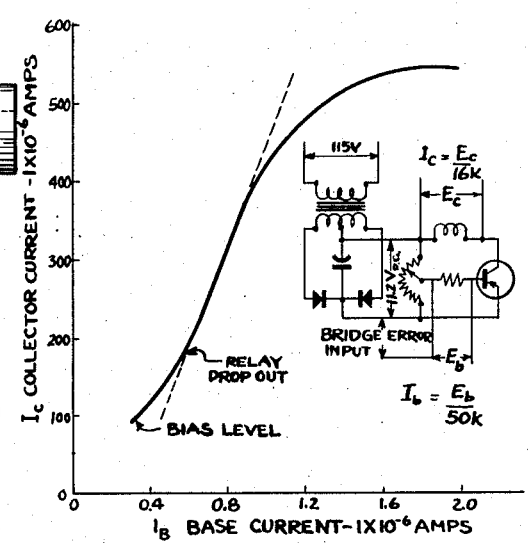
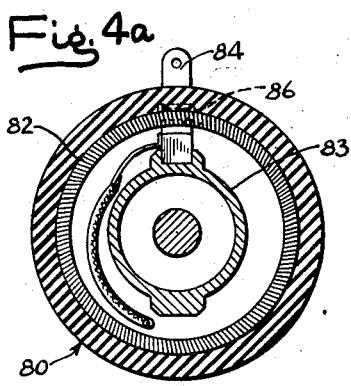

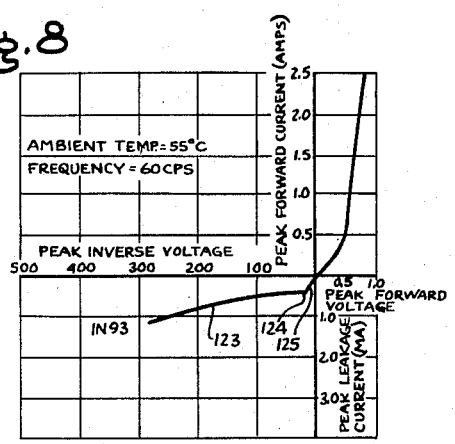
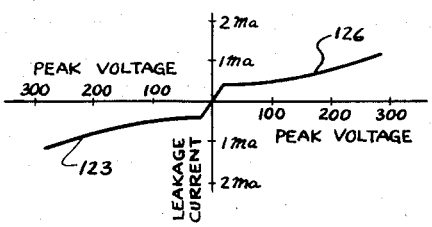
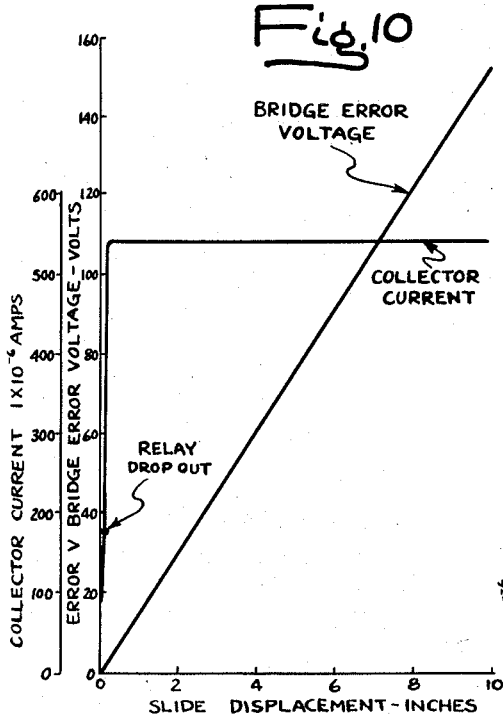
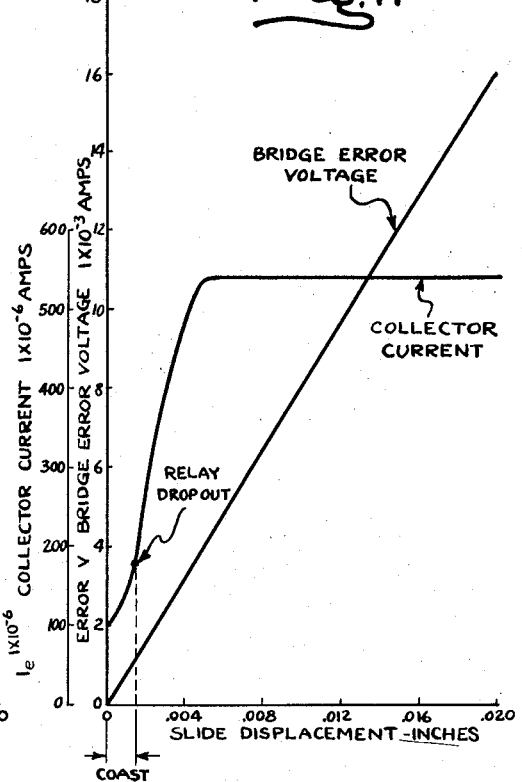
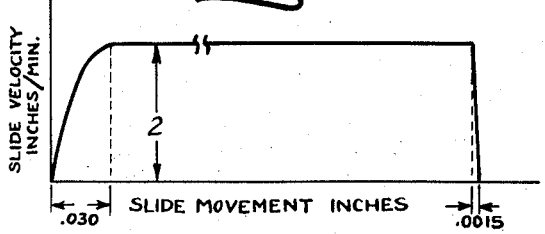
INVENTORS
DANIEL T. KENNEDY
FRANCIS E. HEIBERGER 2,889,507
Patented June 2, 1959

SERVOSYSTEM ADAPTED FOR DIE-FORMING PRESS SLIDE POSITIONING

Daniel T. Kennedy, La Grange Park, and Francis E. Heiberger, Elmhurst, Ill., assignors to Danly Machine Specialties, Inc., Chicago, Ill., a corporation of Illinois Application October 7, 1957, Serial No. 688,538

9 Claims. (Cl. 318—29)

The present invention relates to power driven presses and particularly to means for effecting a quick and accurate adjustment of shut height.

In production presses, the setting of shut height, i.e., the position of the slide with respect to the bolster when the dies are in the position of closest approach, requires a high degree of precision and it is generally done by an experienced press operator using a "trial and error" technique, with the operator observing the effect of change of adjustment upon a series of metal blanks. Appreciable time is required for this even for an expert operator, during which the press must be taken out of production. The adjustment must be repeated each time a new set of dies is substituted. Since the modern tendency is to use presses of the "quick change" type, with as many as six or more die changes for a three-shift working day, it will be appreciated that the total "down time" for adjustment of shut height is appreciable. Moreover, the dies must be "opened" from time to time, being withdrawn to a retracted position for service or inspection, and each time this occurs, readjustment is necessary. Efforts have been made in the past to obtain automatic positioning, but the arrangements which have been proposed for this have been complex and expensive and not suitable for use under practical operating conditions.

Accordingly, it is an object of the present invention to provide a novel slide positioning arrangement for a production press which enables the desired shut height to be achieved with a high degree of accuracy and consistency, time after time, without use of time consuming trial and error procedures. It is a related object to provide a shut height control arrangement which enables a slide to be withdrawn to an upwardly retracted reference position as required for service or the like during the course of using the dies, but in which it is possible to return the slide automatically to a precise working position when it is desired to resume operation of the press.

It is another object of the invention to provide a shut height setting arrangement which, after initial adjustment, enables the correct shut height for a given set of dies to be reproduced automatically thereby enabling precision adjustment to be accomplished by an unskilled and inexperienced operator and in, any event, without wastage of the blanks usually required for sampling purposes incident to adjustment. It is, moreover, an object to provide a shut height setting arrangement and procedure which tends to insure against overtravel or bottoming of the dies upon one another with risk of damaging an expensive press or at the minimum, requiring replacement of overload elements in presses of the type in common use. Consequently, it is an object to provide a slide positioning scheme which reduces the chances of error on the part of the operator, i.e., which largely removes the risk of the "human element" in the setting and operation of the press.

It is an object related to the above to provide a novel slide positioning arrangement for setting the shut height in which the adjustment appropriate for a pair of dies may be stamped on or otherwise affixed to the dies, e.g., directly in terms of inches and decimal fractions thereof, and in which precise adjustment may be effected simply by turning a control dial to such setting.

It is an additional object of the invention to provide a slide positioning arrangement which is highly sensitive to small changes and which employs sensitive, easily damaged detector elements but which, nevertheless, inherently protects such elements against damage or overload under all conditions, requiring no thought or concern on the part of the press operator.

It is a still further object to provide a slide positioning arrangement which makes novel use of the inertia and friction characteristics inherent in a modern motor driven slide positioning mechanism. It is a related object to provide a control arrangement which is readily adaptable to conventional presses and which may be installed both in new presses at time of manufacture and in presses already in use in the field.

Finally, it is an object to provide a slide positioning arrangement which, although highly accurate, is simple and inexpensive to construct, easy to operate, and which requires little or no maintenance over long periods of time under practical, high-production, shop conditions.

Other objects and advantages of the invention will become apparent upon a study of the attached detailed description and reference to the drawings in which:

Fig. 1 is a front elevation, in partial section, of a production press of the underdrive type to which the present invention may be applied, and with the upper die in its lowermost position defining the shut height;

Fig. 2 is a horizontal section taken along the line 2—2 in Fig. 1 and showing the motor driven mechanism for adjusting shut height;

Fig. 3 is a schematic diagram of the circuit employing the present invention used for the purpose of actuating the slide adjusting mechanism;

Fig. 4 is a side view of a multi-turn potentiometer of the type used in carrying out the invention with a portion broken away to show the internal construction;

Fig. 4a is a fragmentary section taken along the line 4a—4a in Fig. 4;

Fig. 5 is a face view of the control dial of Fig. 4;

Fig. 6 shows a multi-turn potentiometer identical to Fig. 4 but with a spur gear provided for driving the potentiometer shaft directly from the motor drive mechanism;

Fig. 7 is a plot of current gain typical of transistors employed in the preferred embodiment of the invention;

Fig. 8 is a typical dynamic voltage-current characteristic of a diode employed in the present invention;

Fig. 9 is the composite voltage-current characteristic of diodes connected back-to-back;

Fig. 10 is a plot of bridge error voltage and collector current over a large range of slide displacement.

Fig. 11 is similar to Fig. 10 showing the variation which occurs in the immediate vicinity of the control point; and Fig. 12 shows the acceleration and deceleration characteristic of the slide incident to making a change in shut height.

While the invention has been described herein in connection with a preferred embodiment, we do not intend to limit the invention to such embodiment but intend to cover such alternative and equivalent constructions as may be included within the spirit and scope of the appended claims.

Turning now to Figures 1 and 2, the press is of the underdrive type having a frame 11 which extends below the level of the floor 12 to accommodate a driving mechanism 13. Such mechanism includes an electric motor (not shown), the speed of which is stepped down by means of gears 14 for driving the main shaft 15 having eccentrically mounted connecting rods 16, 17 which impart oscillatory movement to bell cranks or rocker arms 18, 19. The latter serve to reciprocate vertically mounted pitmans 21, 22. It will be understood that a corresponding crank and pitman arrangement is provided at the other side of the press.

Connected to the upper ends of the pitmans is a massive slide 25 which is vertically slidable on ways 26, 27 provided in the frame. As is conventional, rotation of the driving mechanism produces cycling of the slide through a downward power stroke and an upward return stroke.

Mounted within the working area, indicated at 30, are a pair of cooperating die elements 31, 32, the element 31 being secured to the slide 25 for movement therewith and the lower element 32 being stationarily secured to a bolster 33. In accordance with modern practice, transport means may be provided for permitting quick change of dies from one set to another to accommodate the press to a predetermined production schedule.

Attention may next be given to the motor driven means for setting the shut height of the press, which shut height determines the extent of downward movement of the slide 25 and which may vary over wide limits from one set of dies to another. This adjustment is effected by providing individual screw and nut couplings between the vertically extending pitmans and the slide 25. Extending upwardly through the slide at the four corners thereof are screws 41–44 which are engaged by nuts 45–48. Each of the nuts is in the form of a threaded worm wheel driven by corresponding worms 45a–48a. In order to turn all of the nuts simultaneously, a motor 50 is provided having a speed reducing angle drive 51 and a cross shaft 52 terminating in angle drives 53, 54. The latter drive end shafts 55, 56 terminate in the worms previously referred to. The motor is of the type having an integral brake 50b which is automatically engaged when the motor is deenergized.

In conventional setups, manual means are provided for causing the motor 50 to rotate in one direction or the other, thereby to turn the nuts at all four corners of the slide simultaneously to achieve the desired shut height. Where it is desired to have maximum access for inspection or service, particularly in small-stroke presses, the same manual control means may be employed for driving the nuts toward the end of their range to produce retraction of the upper die. There is sufficient mechanical step-down in the usual system so that the driving speed is at the rate of only an inch or two per minute, so that it requires appreciable time on the part of an operator to run the slide 25 over its range of adjustment.

In carrying out the present invention, a novel automatic control arrangement is provided including an electrical network in the form of a bridge circuit 60 which feeds into an "up" detector circuit 61 and a "down" detector circuit 62 serving to control the forward and reverse operation of a motor or power circuit 63. However, prior to a discussion of the bridge and detector circuits, it will be helpful to have in mind the motor or power circuit 63, the purpose of which is to energize the motor 50 for controlled rotation in one direction or the other. A simple D.-C. circuit has been shown for purposes of ready understanding although it will be apparent that a reversible A.-C. motor arrangement may be used without departing from the invention. Power for driving the motor is supplied from A.-C. power lines 71, 72. The current is converted to D.-C. by means of a bridge rectifier 73. For the purpose of controlling the current to the motor, armature contactors 74, 75 are employed, the contactor 74 having normally open contacts 74a, 74b and a normally closed safety contact 74c; the contactor 75 having normally open contacts 75a, 75b, and a normally closed contact 75c. For exciting the motor field, current is fed to the field winding 50b through a rheostat 76.

While the operation of the motor circuit will be apparent to one skilled in the art, it may be reviewed briefly as follows: When the "up" contactor 74 is energized by means to be described, contacts 74a, 74b are closed, thereby completing the circuit with predetermined polarity from the bridge rectifier 73 so that the motor 50 rotates in the "up" direction. Conversely energizing the contactor 75 closes the contacts 75a, 75b so that the motor rotates in the opposite or "down" direction. Attention will next be directed to the bridge and detector circuits used for alternative energization of the contactors 74, 75.

In accordance with the present invention a high voltage bridge circuit is used having a manually adjustable potentiometer and a follow-up potentiometer with the output of the bridge being coupled to at least one motor-controlling transistor and with a pair of diodes connected back-to-back meaning reversely connected in series being interposed between the bridge and the input of the transistor and having sufficient leakage current to enable the transistor to be operated over the steep portion of its operating range while protecting the transistor against the over voltage resulting from unbalance of the bridge circuit in one direction or the other. In the preferred form of the invention, two transistor detector circuits are employed, 61, 62, which are oppositely polarized and which thus act alternatively in driving the adjusting motor 50 in one direction or the other.

Turning attention first to the bridge circuit 60 it will be seen that it includes a first manually settable potentiometer 80 and a second, or follow-up, potentiometer 81. For maximum accuracy and ease of calibration both of these potentiometers are of the multi-turn, high precision type as shown in Figs. 4 and 5, with equal resistances on the order of 10,000 ohms, and commercially referred to as a "Helipot." As illustrated, the resistance wire 82 may be wound in the worm of a "double helix" and secured to the inner wall of the casing, with the ends thereof being conducted to output terminals 84, 85 respectively. For contacting the resistance wire the rotor 83 has a slider 86 mounted in a longitudinal slot and brought out to a terminal 86a through a suitable slip ring. In a practical case 15 turns of resistance wire may be used with rotor 83 being brought out to a manual control dial 87. Arranged coaxially with respect to the dial 87 is a tally dial 88 suitably geared to the dial 87 by means not shown, so that it advances one unit for each complete revolution of the control dial 87. In accordance with one of the more detailed aspects of the invention, the outer or tally dial 88 may be calibrated directly in inches ranging, for example, from a shut height of 22 inches to a shut height of 34 inches, the smaller dial 87 being calibrated directly in hundredths of an inch with the possibility of estimating to the nearest thousandth.

For purposes of follow-up, the potentiometer 81 is preferably identical to the potentiometer 80 and coupled directly to the motor adjusting mechanism. As shown in Fig. 2 and in enlarged form in Fig. 6, the potentiometer 81 has a spur gear 91 which meshes with a spur gear 92 on the drive shaft 52. Since a positive drive is afforded from the motor to the adjusting nuts, it will be apparent to one skilled in the art that the slider in the potentiometer 81 will occupy a progressive position throughout the entire range of shut height adjustment. The gear ratio is preferably chosen so that one turn of the potentiometer corresponds to one inch of movement of the slide.

As a result of the above, when there is any disparity in the setting of the follow-up potentiometer 81 relative to the control potentiometer 80, a voltage is produced at the output of the bridge which is caused to produce corrective rotation of the motor until the position of the potentiometer 81 coincides with the position of the potentiometer 80, at which time the shut height of the slide will correspond in inches and thousandths of an inch to that which has been set on the dials 88, 87. In order to insure accurate calibration and to compensate for any minor differences between the two potentiometers, an input or balancing potentiometer 93 is provided.

Turning attention to the supply terminals 101, 102 of the bridge circuit, it will be seen that direct voltage is applied thereto by means of a bridge rectifier 103 having a smoothing capacitor 104. Alternating current is fed to the input of the bridge rectifier 103 by means of a regulated constant voltage transformer 105 and a step-up transformer 106. Under conditions of maximum unbalance the full amount of the direct input voltage is available at the output terminals 111, 112 of the bridge circuit.

For the purpose of detecting voltage unbalance of the bridge in one direction, the "up" detector circuit 61 includes a transistor 113 having an input circuit which includes the base 113a, an output circuit which includes the collector 113b, and a common terminal comprising the emitter 113c. We prefer to use the "common emitter" connection in order to secure a high degree of sensitivity, i.e., to produce a maximum change in output current as a function of input current or voltage. As a source of direct voltage, a power supply 114 is used comprising a transformer 115, a full wave rectifier 116 and a smoothing capacitor 117 producing a voltage of about 11.2 volts D.-C.

In series with the output or collector circuit of the transistor is a sensitive relay 118 having contacts 119 which serve to energize the motor contactor 74 previously referred to. This is preferably a relay of about 16,000 ohms which is capable of consistent drop-out at low current levels, i.e., 180 microamperes.

In accordance with one of the aspects of the invention, the transistor 113 is biased so that operation takes place over the steep portion of the output current characteristic curve, and so that some current flows through the relay under static conditions. This has the effect of maximizing sensitivity since even small departures of bridge voltage in the region of the null are effective to cause an appreciable change in the output circuit of the transistor. For this purpose, a bias supply is provided comprising a potentiometer 120 and series resistor 120a, the slider of the potentiometer being coupled to the base of transistor by means of a series resistor 120b. The bias adjustment is set to produce a base current flow on the order of 0.3 microampere under "null" conditions.

In order to more completely understand the effect of bias upon the operation of the transistor 113, reference is made to Fig. 7 which shows the current input and output characteristics of a typical germanium transistor of the type 2N65 which is of the PNP junction variety. This curve was plotted at a supply voltage of 11.2 volts D.-C. by measuring the voltage across the coil of relay 118 as a function of the voltage across the input resistor 120b, the voltage readings being converted to current in order to illustrate the current gain. Resistances of 16,000 ohms and 50,000 ohms were used for elements 118 and 120b respectively. Tests show that a current gain on the order of 625 is achieved with but a single transistor stage. It will be apparent that, with operation established along the steepest portion of the response curve, even slight unbalance of the bridge circuit causes an abrupt and substantially linear increase in the current flowing through the relay winding 118 in the collector circuit of the transistor. Since the minimum flow in the collector circuit even under static conditions is by reason of the bias, on the order of 100 microamperes, the relay is "preconditioned" to close with only a limited increase in current. However, the main benefit of operating over the steep portion of the transistor characteristic in the region of the null is derived not upon departure from the null but upon approaching the balance point following a change, the characteristic being sufficiently steep so that accurate relay drop-out is assured with minimum dependence being placed on the individual relay drop-out characteristics. In short, a high degree of consistency may be obtained even when using ordinary, relatively low cost relays.

With the detector circuit 61 clearly in mind, brief reference to the companion or "down" detector circuit 62 will suffice. The arrangement is identical except for the fact that the transistor is connected to the bridge 60 with opposite polarity so that the two detector circuits operate alternatively depending upon whether the voltage output is in one direction or the other. Corresponding parts are indicated by the corresponding reference numeral plus ten.

In accordance with one of the important aspects of the present invention, a bridge input voltage is used which is many times greater than the voltage rating of the transistors in either their forward or reverse directions, and diodes having a substantially flat leakage characteristic and connected back-to-back are interposed between the bridge and the input circuit of the transistor for severely limiting the current and voltage supplied to the latter to values within their rating. In the present instance, the diodes connected in series with the terminal 112 of the bridge and indicated at 121, 122 will be taken as typical. The diodes selected for this purpose should have a breakdown voltage rating in the inverse direction which exceeds the output voltage of the bridge under conditions of extreme unbalance and should have a low leakage current under such extreme conditions which is within the input current rating of the connected transistor but which is, nevertheless, sufficient, at low voltages in the region of the control point, to drive the transistor over its normal operating range.

While the diodes 121, 122 supplement and cooperate with one another as used in the present circuit, it will be helpful, for purposes of analysis, to consider their action separately. It will be assumed in the following discussion that the diode 121 is reversely connected with respect to the transistor 113 so that the leakage current therethrough is depended upon to swing the transistor over its operating range for operation of the relay 118. To understand the limitation of current applied to the transistor in its forward direction, reference is made to Fig. 8 which shows the forward and reverse, or leakage, characteristics of a type 1N93 diode. The forward conduction characteristic is never utilized during the normal operation of the present circuit. Instead, attention may be given to the reverse or leakage characteristic 123. It will be noted that for peak voltages less than about 300 volts, the current is limited to approximately 1 milliampere, maximum. The current or leakage characteristic remains substantially flat with reducing voltage down to approximately 20 volts, where the curve suddenly breaks as indicated at 124 becoming steep and substantially linear for peak voltages from about 18 volts to 0 volt.

It is helpful to interpret the leakage characteristic curve in terms of the effective resistance interposed by the diode 121 for voltages in the region of the origin, say, 18 volts or less, and for voltages widely departing therefrom and in the range of 300 peak volts. Thus, in the region of the origin, the curve is steep and substantially linear, indicating that for low values of voltage the diode exhibits a low series resistance. Beyond the break point 124, the leakage characteristic is substantially flat, indicating that for voltages above approximately 18 volts, the resistance is at an extremely high value on the order of ½ megohm. The net effect of this is to make the transistor 113 fully and effectively operative for low values of bridge output voltage in the vicinity of the control point while making the transistor substantially immune to high forward values of voltage and current.

Attention may next be focused upon the companion diode 122. The effect brought about by using the diode 122 will be apparent upon considering the composite characteristic of the two diodes connected back-to-back and which is set forth in Fig. 9. Here the leakage characteristic 126 of the diode 122 shows that the transistor 113 is protected against high inverse voltages by reason of the effective high resistance which the diode places in the circuit when operated at voltages of greater than about 18 volts. This resistance, which is on the order of ½ megohm, produces sufficient voltage drop so that the inverse voltage applied across the transistor input terminals, is maintained at a safe value and well within the inverse peak voltage rating of the transistor.

Our observations show that the net effect of the two diodes connected back-to-back is to turn the transistor 113 "on" so that it is effective to operate through its normal operating range at voltages near the origin, i.e., with the bridge almost completely balanced and to cause the transistor to be substantially isolated from the effects of higher voltages existing in the bridge circuit under conditions of substantial unbalance. Under such conditions, i.e., conditions of unbalance in the "forward" direction of the transistor, the transistor simply remains saturated with rated current flowing through its output circuit causing the control relay 118 to remain closed without imposing anything more than a light load upon the transistor. More specifically, we have found that it is readily possible to operate a transistor of the type mentioned above using a bridge input voltage on the order of 235 volts D.-C. so that under conditions of maximum unbalance, the full 235 volts D.-C. is applied across the output terminals of the bridge and, but for the diodes, is coupled directly to the sensitive base element of the transistor having a rated voltage of only about 15–25 volts.

The function of the circuit thus far described is graphically set forth in Fig. 10 which is based upon observed data. It will be assumed in this figure that the condition is that which would exist upon a sudden "dialing in" to the control knob 87, 88 of an instruction calling for 10 inches of total displacement of the slide and which results in an instantaneously effective output voltage at the terminals 111, 112 of the bridge on the order of 150 volts. Under such conditions, the collector current which results in the transistor 113, is on the order of 540 microamperes, well within the rating of the transistor. The resulting collector current causes the relay 118 to be picked up, thereby moving the slide in the corrective direction. It is found that as the voltage drops, the collector current remains almost perfectly constant until the slide is within a small fraction of an inch of its desired position, at which time an abrupt drop in collector current takes place with drop-out of the relay occurring at about 180 microamperes.

To make it easier to focus upon what occurs during the last few thousandths of an inch of slide displacement, reference is made to Fig. 11 where the horizontal slide displacement scale has been greatly expanded (by a factor of 500). Here it will be noted that the collector current persists at its constant value as the bridge voltage is reduced to about 4 volts, corresponding to a disparity from actual position of only about 0.005 inch. The collector current then progressively drops as the precise set point is approached, and when the current drops to about 180 microamperes, the relay 118 in the collector circuit drops out. At such point the contactor 74 also drops out thereby opening the circuit to the motor armature. Deceleration occurs promptly by reason of the friction in the system and by reason of the brake forming a part of the motor so that the slide coasts only approximately two thousandths of an inch as required to bring such slide precisely to the set point.

In accordance with one of the more detailed aspects of the invention, the drop-out point of the relay 118 is adjusted, adjustment means being conventionally provided on sensitive relays, so that the slide adjusting motor is cut off just prior to the slide reaching its desired position. It will be apparent that we have coordinated in a novel fashion, and made use of, the friction and inertia characteristics of a conventional slide adjusting means set forth in Fig. 12, to cause a final but limited coasting into the set point. The amount of coasting is the same with a high degree of consistency, provided only that the slide movement exceeds that which is required to get up to rated speed which in a practical case is only 0.030 inch. Consequently, when making changes in shut height of less than 0.030 inch, it is desirable to back off more than this amount prior to bringing the manual control to the final setting. The drop-out of the relay prior to the time that the precise position is reached has the effect of providing a narrow dead band around the control point, which nevertheless is sufficient to insure that no instability or hunting will occur. It will be apparent from what has been said that a high degree of sensitivity may be achieved combined with stability which far exceeds that normally obtainable with an "on-off" type of control circuit free of derivative action of any kind.

In accordance with one of the aspects of the invention, selectable means are provided in the bridge circuit for unbalancing the control or "setting" side of the bridge circuit by a predetermined amount for retraction of the slide as required for service or inspection. In the present instance, this is accomplished by an auxiliary potentiometer 140 on the control side and which is in series with a resistor 141. In order to switch the auxiliary potentiometer 140 into the circuit and to simultaneously switch the regular setting potentiometer 80 out of the circuit, a single pole, double throw switch is provided having normally open contacts 142, normally closed contacts 143 and a suitable manual operator 144. It will be apparent that when the manual operator 144 is moved into the "retract" position shown dotted, the contacts 143 are opened and the contacts 142 are closed so that the potentiometer is preadjusted to an off-center condition at the upper end of the range, such adjustment being facilitated by the presence of the series resistor 141. The resulting unbalance produces a voltage across the output terminals 111, 112 of the bridge of a polarity matching that of the transistor 113 in the "up" detector circuit 61. Consequently, the relay 118 closes, closing the contacts 119 and thereby energizing the contactor 74 causing the motor 50 to rotate in the "up" direction, with accompanying follow-up movement of the potentiometer 81, until the slide reaches the desired position, at which time balance is achieved and the motor turns itself off.

After the inspection or service is completed, the operator 144 is simply restored to its normal position, which restores control to the potentiometer 80 so that the slide will be moved automatically down to the correct shut height position in accordance with the setting entered on the control dial 87, 88. Consequently no laborious resetting is necessary.

Résumé of operation

While the operation of the device will be apparent to one skilled in the art in the light of the above, it may be reviewed briefly as follows. It will be assumed that the correct shut height for a given set of dies has been previously determined by a skilled pressman, by a process of trial and adjustment with small incremental advancement of the control knob 87, 88. The setting which is found to produce optimum results is then recorded in permanent form, preferably being stamped directly upon the dies. This is the first and only time that manual adjustment by observation is necessary. When the same set of dies is required at a later time they are moved into the work area by a modern quick die change mechanism. The steps recommended by the manufacturer are then followed to secure the dies in place and to ready them for production. In a modern press having quick change features, this consumes only a few minutes. Included as one of the steps is the following: "Dial correct shut height for second die on automatic slide positioner." Using the figures stamped on the dies the control dial is rotated to the required setting. When the power is applied, this produces a relatively high output voltage at the terminals of the bridge which is applied to the first set of diodes 121, 122 and the second set of diodes 131, 132. Under high voltage conditions such diodes as discussed above, offer a high resistance, and the only current which is permitted to flow is the leakage current. This current energizes the collector circuit of the forwardly-faced transistor but has no effect upon the transistor which is reversely polarized with respect to the applied voltage. Consequently, one of the control relays will be picked up causing the corresponding contactor, either 74 or 75, to be energized, thereby producing rotation of the motor 50 in a direction to bring the slider of the follow-up potentiometer into accordance with the setting of the control potentiometer 80, accompanied by movement of the slide.

In spite of the fact that the output voltage of the bridge may be high, for example in a typical case on the order of 150 volts, the collector current of the active transistor remains at a low safe value, i.e., until the bridge is substantially balanced and the slide within about 0.004 inch of its desired position. Further reduction in the output voltage of the bridge then causes an abrupt proportional drop in collector current. The abruptness is brought out in Fig. 10, with the changes in the immediate vicinity of the control point being set forth in Fig. 11 on an expanded scale. Here it will be noted that the relay is adjusted to drop out at a point of collector current corresponding to an error of about 0.002 inch, causing drop-out of the corresponding contactor and the cutting off of current to the driving motor. Moreover, a brake included in the motor 50 is simultaneously energized. Because of this and the other friction in the system, the motor stops abruptly in accordance with the characteristics shown in Fig. 12, coasting a consistent amount on the order of 0.002 inch. The exact amount of coasting will of course vary from press to press; where the amount is greater than 0.002 inch, say 0.005 inch, the relays 118, 128 are simply set to drop out at a correspondingly higher current value.

It will be apparent that the device meets all of the shop requirements for a shut height control providing a single direct reading control dial. The possibility of damaged dies or broken overload links is substantially eliminated even with inexperienced personnel. The device itself uses simple and readily available components, making it unnecessary to use selsyns or other expensive elements and without necessity for derivative action so that the cost of equipping and servicing a press is far less than when using competitive arrangements. Installation in the press is a simple matter so that it is feasible to equip presses in the field as well as new presses.

In the following claims it is specified that the bridge voltage "greatly exceeds" the rating of the transistor, either as a matter of voltage breakdown or as a matter of the resulting current which would flow in the input circuit of the transistor if unopposed by the novel diode arrangement. It is one of our teachings that the bridge voltage should be made just as high as possible giving a maximum voltage change per inch of slide movement, say, 20 mv. per 0.001 inch, while maintaining the voltage sufficiently low so that the inverse leakage current through the diodes does not produce overloading of the active transistor under conditions of extreme unbalance. Consequently, the term "greatly exceeds" should be interpreted to mean a value of voltage which is at least several times as great as the transistor voltage rating and preferably about 10 or more times as great.

In the following claims the term "relay" shall include any switching device in which a small amount of power at the input controls a large amount of power at the output and which device may be of the mechanical type or static, i.e., contactless, type.

This is a continuation-in-part of an application Ser. No. 674,800, filed July 29, 1957.

We claim as our invention:

1. In a production press having a movable slide together with reciprocating driving means and having means including an adjusting motor for adjusting shut height, the combination comprising a bridge circuit having a control potentiometer and a follow-up potentiometer, said control potentiometer being arranged for manual setting and said follow-up potentiometer being mechanically coupled to the adjusting means, said bridge having output terminals, first and second transistors having their input circuits coupled with opposite polarity to the output terminals of said bridge and having relay means in their respective output circuits, said relay means being coupled to said adjusting motor for correctively driving the same in one direction or the other, means for applying to the input terminals of said bridge a voltage which greatly exceeds the rating of the transistors, each of said transistors having included in its input circuit a pair of diodes connected back-to-back so that the current from said bridge circuit to said diodes is limited to the reverse leakage current of said diodes, said transistors being so chosen that they operate within their rated limits and produce substantially full rated output current upon being subjected to said leakage current, and means for biasing said transistors so that operation thereof takes place over the steep portion of the characteristic curve, said relay means being so adjusted as to produce drop out on the steep portion of the transistor characteristic curve at a point of time and voltage slightly in advance of the achievement of precise balance in the bridge so that a predetermined small amount of coasting of the adjusting motor causes the slide to be eased into the precisely desired position of adjustment.

2. In a production press having a movable slide together with reciprocating driving means and having means including an adjusting motor for adjusting shut height, the combination comprising a bridge circuit having a setting potentiometer and a follow-up potentiometer, said follow-up potentiometer being mechanically coupled to the shut height adjusting means, the circuit being so arranged that the direction and magnitude of the output voltage of the bridge circuit depends upon the direction and magnitude of the difference in the settings of the two potentiometers, first and second sensitive detectors coupled with opposite polarity to the output of said bridge circuit, said detectors having relay means included in the respective output circuits thereof for energizing the adjusting motor correctively in one direction or the other as required to bring the follow-up potentiometer into accordance with the setting potentiometer and thereby to adjust the shut height to the desired value, said detectors being of the type having a high current gain and severely limited voltage and current input ratings, means for applying to the input terminals of said bridge circuit a voltage many times greater than the voltage rating of said sensitive detectors, and two pairs of diodes connected back-to-back interposed between the output terminals of said bridge circuit and the respective inputs of said sensitive detectors for limiting the current supplied to said detectors to an amount not exceeding the reverse leakage current characatristic of said diodes.

3. In a production press having a movable slide together with reciprocating driving means and having means including an adjusting motor for adjusting shut height, the combination comprising a circuit network having a setting element and a follow-up element and providing an output voltage, the follow-up element being coupled to the shut height adjusting means, the circuit being so arranged that the direction and magnitude of the output voltage of the circuit network depends upon the direction and magnitude of the difference in the settings of the two elements, first and second sensitive detectors coupled with opposite polarity to the output of said network, said detectors having relay means included in the respective output circuits thereof for energizing the adjusting motor correctively in one direction or the other as required to bring the follow-up element into accordance with the setting element, said detectors being of the type having a high current gain and severely limited voltage and current input ratings, means for applying to the input terminals of said network a voltage which greatly exceeds the voltage rating of said sensitive detectors and a pair of diodes connected back-to-back interposed between the output terminals of said network and the inputs of said sensitive detectors for limiting the current supplied to said detectors to an amount not exceeding the reverse leakage current characteristic of said diodes.

4. In a position control system for a machine element or the like the combination comprising a driving motor, a control network having a position setting element calibrated in terms of position and a follow-up element coupled to the machine element for movement therewith, the network being so arranged that the output voltage thereof is zero when the positions of the elements coincide and progressively greater when the positions of the elements differ from one another, first and second detector circuits including transistors having their inputs coupled to the output of said network with opposite polarity and having relays in their respective output circuits, means under the control of said relays for driving the motor in one direction or the other for corrective positioning of said machine element, said network being so excited and arranged that the voltage at the output of the network greatly exceeds the rating of the transistors except when the position of the machine element is within a few thousandths of an inch of the setting of the calibrated element, each of said transistors being coupled to the output of the network through a pair of diodes connected back-to-back and offering a high leakage resistance for values of network output voltage exceeding the rating of said transistors.

5. In a position control system for a machine element or the like the combination comprising a driving motor, a control network having a position setting element calibrated in terms of position and a follow-up element coupled to the machine element for movement therewith, the network being so arranged that the output voltage thereof is zero when the positions of the elements coincide at a control point and progressively greater when the positions of the elements differ from one another, a detector circuit including a transistor having its input coupled to the output of said network and having a relay in its output circuit, means under the control of said relay for driving the motor for corrective positioning of said machine element, said network being so excited and arranged that the voltage at the output of the network greatly exceeds the rating of the transistor except when the position of the machine element is close to the setting of the calibrated element, said transistor being coupled to the output of the network through a pair of oppositely facing diodes offering a high leakage resistance for values of network output voltage exceeding the rating of said transistor and a relatively low resistance for values of network output voltage within the normal rating of said transistor, said transistor being biased so that operation thereof in the region of the control point takes place along the steep portion of the transistor gain characteristic.

6. In a position control system for a machine element or the like the combination comprising a driving motor, a control network having a position setting element calibrated in terms of position and a follow-up element coupled to the machine element for movement therewith, the network being so arranged that the output voltage thereof is zero when the positions of the elements coincide at a control point and progressively greater when the positions of the elements differ from one another, first and second detector circuits including transistors having their inputs coupled to the output of said network with opposite polarity and having relays in their respective output circuits, means under the control of said relays for driving the motor in one direction or the other for corrective positioning of said machine element, means for biasing said transistors so that static current flows in the output circuit thereof under all conditions, said network being so excited and arranged that the voltage at the output of the network greatly exceeds the rating of the transistors except when the position of the machine element is close to the setting of the calibrated element, each of said transistors being coupled to the output of the network through a pair of diodes connected back-to-back and offering a substantially flat high resistance leakage characteristic for values of network output voltage exceeding the rating of said transistors and a relatively low resistance for values of network output voltage within the rating of said transistors.

7. In a position control system for a machine element or the like the combination comprising a driving motor, a control network having a position setting element calibrated in terms of position and a follow-up element coupled to the machine element for movement therewith, the network being so arranged that the output voltage thereof is zero when the positions of the elements coincide at a control point and progressively greater when the positions of the elements differ from one another, first and second detector circuits including transistors having their inputs coupled to the output of said network with opposite polarity and having relays in their respective output circuits, means under the control of said relays for driving the motor in one direction or the other for corrective positioning of said machine element, said network being so excited and arranged that the voltage at the output of the network greatly exceeds the rating of the transistors except when the position of the machine element is within a few thousandths of an inch of the setting of the calibrated element, each of said transistors being coupled to the output of the network through a diode having a substantially flat high resistance leakage current characteristic at voltages exceeding the voltage rating of the transistor and having a relatively low resistance for values of voltage within the voltage rating of the transistor, each of said diodes being reversely connected with respect to the associated transistor so that the transistor input current even under conditions departing substantially from the control point is kept at a level which is well within the transistor rating.

8. In a production press having a movable slide together with reciprocating driving means and having means including an adjusting motor for adjusting shut height, the combination comprising a circuit network having a setting element and a follow-up element, the follow-up element being coupled to the shut height adjusting means, the circuit being so arranged that the direction and magnitude of the output voltage of the circuit network depends upon the direction and magnitude of the difference in the settings of the two elements, first and second sensitive detectors including transistors coupled with opposite polarity to the output of said network, said detectors having relays included in the respective output circuits thereof for energizing the adjusting motor correctively in one direction or the other as required to bring the follow-up element into accordance with the setting element and thereby to obtain the desired shut height, means for biasing the detector circuits so that currents of predetermined magnitude flow through said relays respectively even in the absence of voltage from said network thereby to precondition said respective relays toward closure upon flow of a small current from said network of one polarity or the other, and means interposed between said network and said detectors for limiting the voltage and current supplied to said detectors to an amount which is within the rating of the transistors.

9. In a position control system for a machine element or the like the combination comprising a driving motor, a control network having a position setting element calibrated in terms of position and a follow-up element coupled to the machine element for movement therewith, the network being so arranged that the output voltage thereof is zero when the positions of the elements coincide at a control point and progressively greater when the positions of the elements differ from one another, first and second detector circuits including transistors having their inputs coupled to the output of said network with opposite polarity and having relays in their respective output circuits, means under the control of said relays for driving the motor in one direction or the other for corrective positioning of said machine element, said network being so excited and arranged that the voltage at the output of the network greatly exceeds the rating of the transistors except when the position of the machine element is within a few thousandths of an inch of the setting of the calibrated element, each of said transistors being coupled to the output of the network through current limiting means having the substantially flat high resistance leakage current characteristic which is characteristic of a diode at voltages exceeding the voltage rating of the transistor and having a relatively low resistance for values of voltage within the voltage rating of the transistor so that the transistor input current even under conditions departing substantially from the control point is kept at a level which is well within the transistor rating.

No references cited.